United States Patent
Stroup et al.

(10) Patent No.: US 9,498,806 B2
(45) Date of Patent: Nov. 22, 2016

(54) SELF-RAISING DRIVE-OVER ENTRANCEWAYS FOR CONTAINMENT BERMS

(71) Applicant: New Pig Corporation, Tipton, PA (US)

(72) Inventors: Justin L. Stroup, Altoona, PA (US);
Anthony Scott Diminick, Hollidaysburg, PA (US)

(73) Assignee: New Pig Corporation, Tipton, PA (US)

( * ) Notice: Subject to any disclaimer, the term of this patent is extended or adjusted under 35 U.S.C. 154(b) by 0 days.

(21) Appl. No.: 14/297,971

(22) Filed: Jun. 6, 2014

(65) Prior Publication Data

US 2014/0363233 A1 Dec. 11, 2014

Related U.S. Application Data

(60) Provisional application No. 61/831,752, filed on Jun. 6, 2013.

(51) Int. Cl.
*E02B 8/00* (2006.01)
*E02B 7/02* (2006.01)
*B08B 17/02* (2006.01)
*F16N 31/00* (2006.01)

(52) U.S. Cl.
CPC ........... *B08B 17/025* (2013.01); *F16N 31/006* (2013.01)

(58) Field of Classification Search
CPC .................................... E02B 7/02; E02B 8/00
See application file for complete search history.

(56) References Cited

U.S. PATENT DOCUMENTS

| | | | |
|---|---|---|---|
| 92,364 A | 7/1869 | Rider | |
| 935,278 A | 9/1909 | Smyth | |
| 4,671,024 A | 6/1987 | Schumacher | |
| 5,090,588 A | 2/1992 | Van Romer et al. | |
| 5,316,175 A | 5/1994 | Van Romer | |
| 5,429,437 A | 7/1995 | Shaw et al. | |
| 5,511,683 A | 4/1996 | Dailey | |
| 5,547,312 A | 8/1996 | Schmitz, Jr. | |
| 5,597,001 A * | 1/1997 | Rasmussen et al. | 134/104.2 |
| 5,762,233 A | 6/1998 | Van Romer | |
| 5,820,297 A | 10/1998 | Middleton | |
| 5,924,461 A | 7/1999 | Shaw et al. | |
| 6,092,686 A | 7/2000 | Shaw et al. | |
| 6,312,192 B1 | 11/2001 | Déry | |
| 6,551,025 B2 | 4/2003 | Dery | |
| 6,648,008 B1 * | 11/2003 | Price | 137/312 |
| 6,880,720 B2 | 4/2005 | Van Romer | |
| 6,880,721 B1 | 4/2005 | Barrett et al. | |
| 7,168,588 B2 | 1/2007 | Van Romer | |
| 7,255,137 B2 | 8/2007 | MacDonald | |

(Continued)

*Primary Examiner* — Tara M. Pinnock
(74) *Attorney, Agent, or Firm* — Alan G. Towner, Esq.; Pietragallo Gordon Alfano Bosick & Raspanti LLP (57) ABSTRACT

Self-raising drive-over entranceways for containment berms are disclosed. The entranceway includes a horizontal bottom panel and a collapsible sidewall that is held in a partially collapsed position forming a void between the bottom panel and sidewall. During a spill or the filling of the containment berm with a fluid, the void area between the partially collapsed sidewall and the horizontal bottom panel fills with the fluid and exerts hydrostatic pressure against the partially collapsed sidewall, forcing it to rotate upward. The higher the fluid level, the more hydrostatic pressure is applied against the sidewall, forcing it up higher until the sidewall obtains a vertical orientation. The sidewall may be restrained either by straps, braces or the like to prevent the fluid from escaping the containment area.

16 Claims, 5 Drawing Sheets

(56) References Cited

U.S. PATENT DOCUMENTS

| | | |
|---|---|---|
| RE39,971 E | 1/2008 | Van Romer |
| 7,374,062 B2 | 5/2008 | Van Romer |
| 7,506,777 B2 | 3/2009 | Ramp et al. |
| 8,016,151 B2 | 9/2011 | Barrett et al. |
| 8,979,433 B2 * | 3/2015 | Shaw .......................... 405/116 |
| 2003/0029873 A1 | 2/2003 | Moffat et al. |
| 2005/0051547 A1 | 3/2005 | Van Romer |
| 2011/0174813 A1 | 7/2011 | Ramp et al. |
| 2012/0000914 A1 | 1/2012 | Barrett et al. |
| 2012/0187119 A1 | 7/2012 | McAtarian et al. |
| 2012/0193369 A1 | 8/2012 | Beak et al. |

* cited by examiner

SELF-RAISING DRIVE-OVER ENTRANCEWAYS FOR CONTAINMENT BERMS

CROSS-REFERENCE TO RELATED APPLICATION

This application claims the benefit of U.S. Provisional Patent Application Ser. No. 61/831,752 filed Jun. 6, 2013, which is incorporated herein by reference.

FIELD OF THE INVENTION

The present invention relates to containment berms, and more particularly relates to self-raising drive-over entranceways for containment berms.

BACKGROUND INFORMATION

Liquid containment berms are used to prevent hazardous fluids from entering the environment from the spillage of the fluids during, for example, the loading and unloading of storage containers and transport vehicles, wash-down of equipment and vehicles, and repair/maintenance of equipment and vehicles. Conventional containment berms may be intended for permanent use, while others are designed to be portable.

One type of permanent containment berm is disclosed in U.S. Pat. No. 5,820,297, which is incorporated herein by reference. Such permanent berms are built from multiple elongated strips connected by corner pieces that are secured to a floor or ground by an adhesive such as caulking.

Examples of portable containment berms are disclosed in U.S. Pat. Nos. 5,316,175, 5,762,233, 6,092,686 and 6,880,720, which are incorporated herein by reference. Such portable berms have a floor and sidewalls made with flexible sheets of barrier material that allows the berms to be folded or rolled up for easy storage and transport. The flexible sidewalls may be held in their raised vertical positions by braces.

SUMMARY OF THE INVENTION

The present invention provides self-raising drive-over entranceways for containment berms. The entranceway includes a horizontal bottom panel and a collapsible sidewall that is held in a partially collapsed position forming a void between the bottom panel and sidewall. During a spill or the filling of the containment berm with a fluid, the void area between the partially collapsed sidewall and the horizontal bottom panel fills with the fluid and exerts hydrostatic pressure against the partially collapsed sidewall, forcing it to rotate upward. The higher the fluid level, the more hydrostatic pressure is applied against the sidewall, forcing it up higher until the sidewall obtains a vertical orientation. The sidewall may be restrained either by straps, braces or the like to prevent the fluid from escaping the containment area. The self-raising drive-over entranceways may be used in conjunction with permanent or portable containment berms. For example, the self-raising drive-over entranceways may be substituted for a wall section of a permanent containment berm to allow easy access to the containment area by vehicles such as trucks, carts, hand-trucks and the like.

An aspect of the present invention is to provide a containment berm comprising: at least one fluid-containing sidewall; and at least one entranceway attached to the at least one fluid-containing sidewall. The at least one entranceway comprises: a bottom panel; a collapsible sidewall movable from a partially collapsed position to a raised position upon introduction of a fluid into the containment berm, and movable from the partially collapsed position to a fully collapsed position upon traverse of a vehicle across the entranceway; and a limiter attached to the bottom panel structured and arranged to support the collapsible sidewall in its partially collapsed position.

Another aspect of the present invention is to provide a containment berm comprising: at least one fluid-containing sidewall; and at least one entranceway attached to the at least one fluid-containing sidewall. The at least one entranceway comprises: a bottom panel; a collapsible sidewall movable from a partially collapsed position to a raised position upon introduction of a fluid into the containment berm, and movable from the partially collapsed position to a fully collapsed position upon traverse of a vehicle across the entranceway, wherein the collapsible sidewall does not include a flotation device attached thereto and is movable from the partially collapsed position toward the raised position as a result of hydrostatic force applied by the fluid against the collapsible sidewall; and a limiter between the bottom panel and the collapsible sidewall structured and arranged to support the collapsible sidewall in its partially collapsed position.

A further aspect of the present invention is to provide a containment berm comprising: at least one substantially rigid modular fluid-containing sidewall; and at least one entranceway attached to the at least one fluid-containing sidewall. The at least one entranceway comprises: a bottom panel; a collapsible sidewall movable from a partially collapsed position to a raised position upon introduction of a fluid into the containment berm, and movable from the partially collapsed position to a fully collapsed position upon traverse of a vehicle across the entranceway; and a limiter between the bottom panel and the collapsible sidewall structured and arranged to support the collapsible sidewall in its partially collapsed position.

Another aspect of the present invention is to provide an entranceway for a containment berm comprising: a bottom panel; a collapsible sidewall movable from a partially collapsed position to a raised position upon introduction of a fluid into the containment berm, and movable from the partially collapsed position to a fully collapsed position upon traverse of a vehicle across the entranceway; and a limiter attached to the bottom panel structured and arranged to support the collapsible sidewall in its partially collapsed position.

These and other aspects of the present invention will be more apparent from the following description.

DETAILED DESCRIPTION

Figure 1:
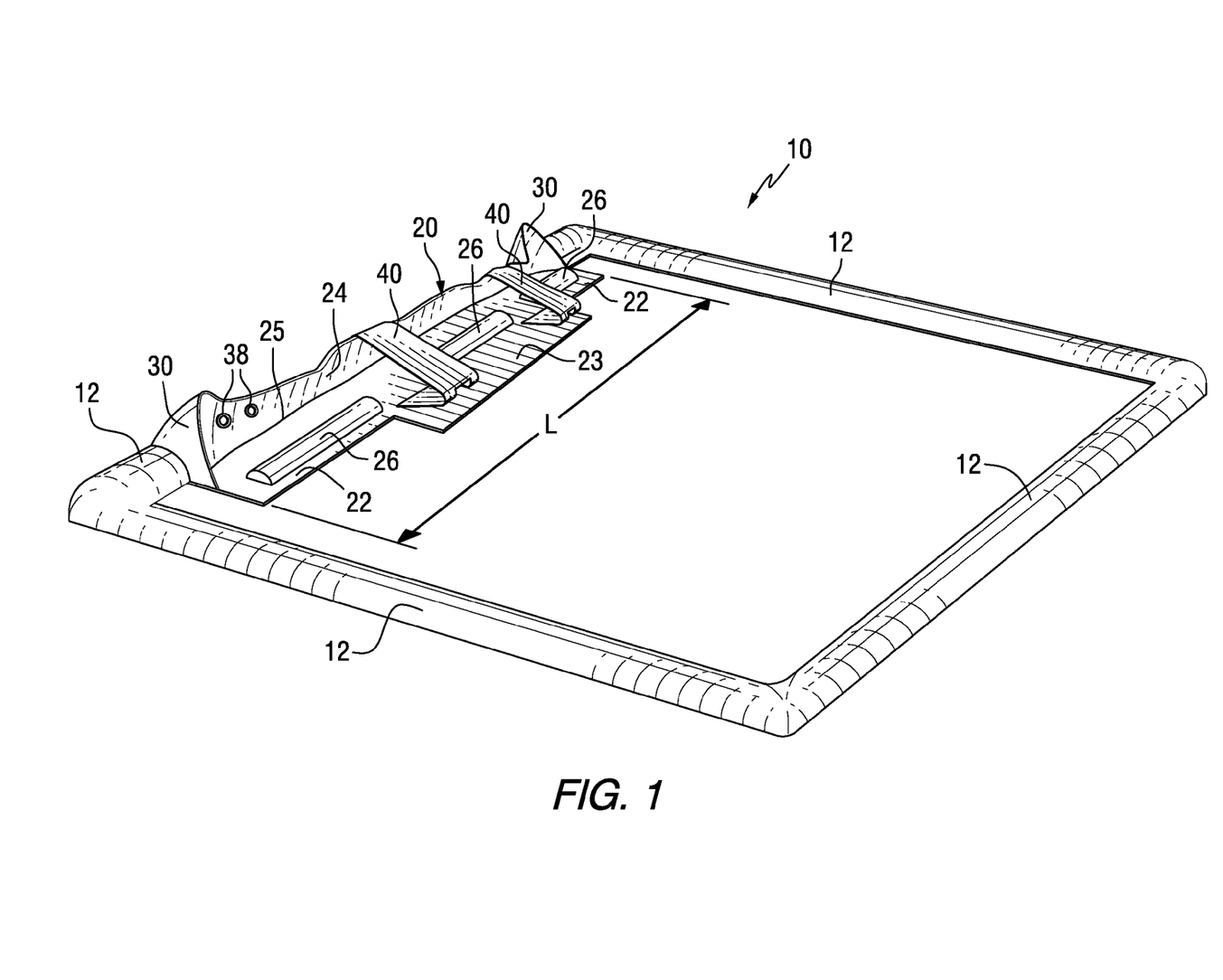
FIG. 1 is an isometric view of a containment berm having a self-raising drive-over entranceway in accordance with an embodiment of the present invention.
Figure 2:
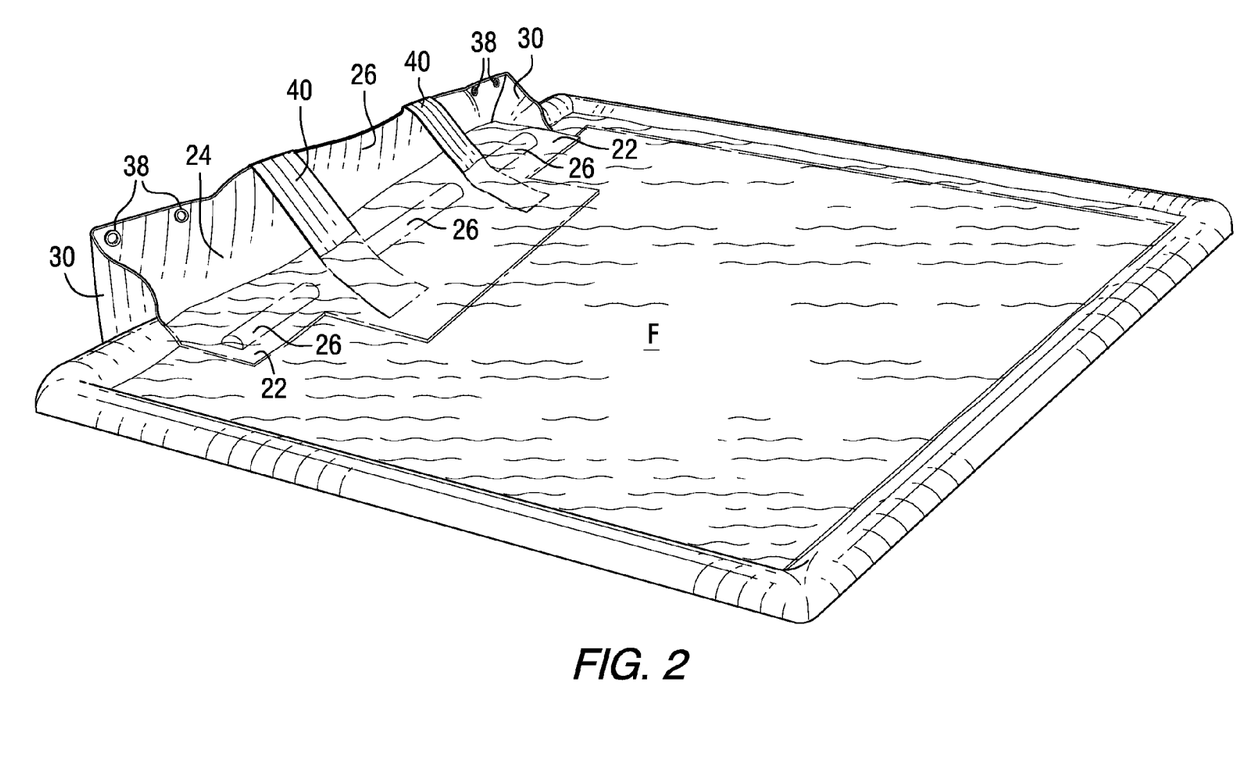
FIG. 2 is an isometric view of the containment berm of FIG. 1, with a fluid contained therein.

FIGS. 1 and 2 illustrate a containment berm 10 in accordance with an embodiment of the present invention. The containment berm 10 includes fluid-containing sidewalls 12 and a self-raising drive-over entranceway 20 in accordance with an embodiment of the present invention. In FIG. 1, the self-raising drive-over entranceway 20 is in a partially collapsed position and the containment berm 10 does not have a fluid contained therein. In FIG. 2, the self-raising drive-over entranceway 20 is in a raised containment position in which a fluid F is contained inside the berm 10. As shown in FIG. 1, the self-raising drive-over entranceway 20 has a length L that may be selected as desired to accommodate vehicles of various sizes. In certain embodiments, the length L of the self-raising drive-over entranceway 20 may typically range from 2 to 20 feet, for example, from 3 to 10 feet.

The self-raising drive-over entranceway 20 includes a bottom panel 22 that may be secured to the floor or ground by any suitable means such as an adhesive. In the embodiment shown in FIGS. 1 and 2, the bottom panel 22 includes an optional extended portion 23. A collapsible sidewall 24 is connected to the bottom panel 22. For example, the bottom panel 22 and collapsible sidewall 24 may be formed from a single sheet of flexible material that can fold at the intersection of the bottom panel 22 and collapsible sidewall 24 so as to form a flexible hinge or fold line 25. Alternatively, the bottom panel 22 and collapsible sidewall 24 may comprise separate sheets of material that are sealed together by any suitable means such as adhesive, welding, or the like. The bottom panel 22 and collapsible sidewall 24 may comprise any suitable liquid-proof flexible material, such as modified vinyl or polyurethane coated fabric or nonwoven.

The collapsible sidewall 24 may have vertical stiffening ribs (not shown) attached or embedded into it. The collapsible sidewall 24 may be restrained, braced or the like to prevent unwanted outward movement beyond the fully raised position. For example, as shown in FIGS. 1 and 2, restraining straps 40 may be provided in order to restrict the vertical movement of the sidewall 24 to approximately 90° from horizontal. Grommets 38 may be provided in the collapsible sidewall 24.

The entranceway 20 may be sealed at each end to the fluid-containing sidewall 12 of a containment berm 10 by means of foldable connecting flaps 30. The fluid-containing sidewalls 12 may be of the permanent type, e.g., each fluid-containing sidewall 12 may be substantially rigid and/or non-collapsible. In certain embodiments, such permanent fluid-containing sidewalls 12 may be of modular construction, may be secured together with corner pieces, and may be secured to a floor or ground by an adhesive. In other embodiments, the fluid-containing sidewalls 12 may be flexible and/or collapsible, for example, when the containment berm 10 is of the portable type.

Figure 3:
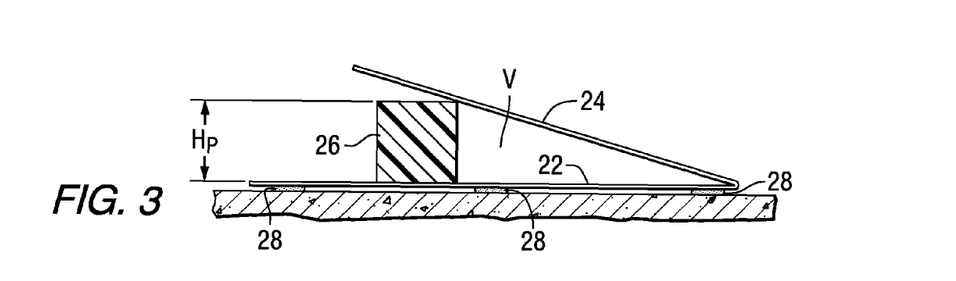
FIG. 3 is a partially schematic side view illustrating a self-raising drive-over entranceway with a collapsible sidewall in a partially collapsed position in accordance with an embodiment of the present invention.

The self-raising drive-over entranceway 20 includes a limiter 26 that holds the collapsible sidewall 24 in a partially collapsed position. As shown in FIG. 3, the limiter 26 prevents the collapsible sidewall 24 from completely lowering in order to allow a small void space V between the sidewall 24 and the bottom panel 22. When the collapsible sidewall 24 is in its partially collapsed position, any liquid introduced into the containment berm is contained as a result of the fluid entering the void space V between the bottom panel 22 and the collapsible sidewall 24 and exerting hydrostatic pressure against the interior surface of the collapsible sidewall 24. Such hydrostatic pressure forces the collapsible sidewall 24 upward to thereby contain the fluid. The limiter 26 may be made of any suitable material having sufficient resiliency or elasticity to return to its original shape and/or height after the weight of a vehicle or the like is removed. For example, the limiter 26 may be made of a compressible material, such as open cell polyurethane foam, or a three dimensional pocket or loop made from, for example, the same flexible material of the collapsible sidewall 24 or bottom panel 22. The limiter 26 may be a continuous length across the entranceway. However, in order to facilitate the flow of fluid into the void space V between the bottom panel 22 and the collapsible sidewall 24, the limiter may be discontinuous along its length, e.g., the limiter 26 may comprise discretely spaced segments, as shown in FIGS. 1 and 2. Thus, the limiter may comprise 2, 3, 4, or more segments.

FIGS. 3-6 sequentially illustrate how the collapsible sidewall 24 and limiter 26 of the self-raising drive-over entranceway 20 function to contain a fluid F when the fluid is introduced into a containment berm. In FIG. 3, the sidewall 24 rests on the limiter 26 when no fluid is present inside the containment berm. In this partially collapsed position, the limiter 26 acts as a spacer to provide the void space V between the collapsible sidewall 24 and the bottom panel 22. The limiter 26 has a height that holds at least a portion of the collapsible sidewall in the partially collapsed position shown in FIG. 3. The limiter 26 may have a typical height ranging from 0.1 to 2 inches or more, for example, from 0.25 to 1.5 inches, or from 0.5 to 1 inch. The height $H_P$ of the collapsible sidewall 24 in its partially collapsed position may be the same as the height of the limiter 26. In embodiments where the limiter 26 has a non-planar upper surface (e.g., rounded, peaked, etc.), its height and the height $H_P$ of the partially collapsed sidewall 24 are measured at the highest vertical point of the limiter 26 from the bottom panel 22.

Although the collapsible sidewall 24 is schematically shown in FIG. 3 as being planar, it is to be understood that when the sidewall 24 is made of a flexible sheet of material, it may be draped over the limiter 26 and may follow the contour of at least a portion of the limiter 26. The interior surface of the collapsible sidewall 24 may thus contact some or all of the upper surface of the limiter 26.

Figure 4:
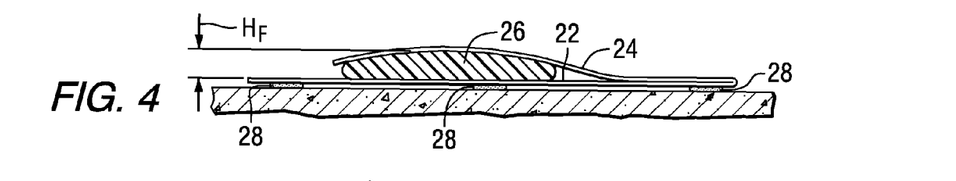
FIG. 4 is a partially schematic side view similar to FIG. 3 with the collapsible sidewall in a fully collapsed position.

FIG. 4 schematically illustrates the collapsible sidewall 24 and limiter 26 in a fully collapsed position in which the limiter 26 and overlying collapsible sidewall 24 have a fully collapsed height $H_F$. In the position shown in FIG. 4, the limiter 26 is compressed, e.g., by the weight of a vehicle traveling thereover (not shown). After the vehicle passes, the limiter 26 and collapsible sidewall 24 return to the positions shown in FIG. 3.

Figure 5:
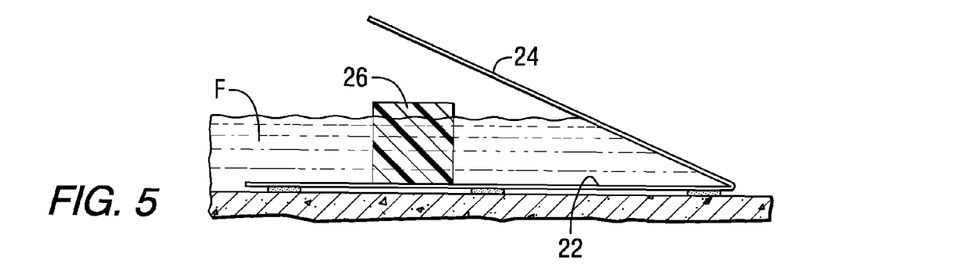
FIG. 5 is a partially schematic side view similar to FIG. 3 with the collapsible sidewall moved upward as a result of hydrostatic pressure applied by a fluid contained in the berm.

As shown in FIG. 5, when a fluid F begins to partially fill a containment berm, it enters the void space V between the bottom panel 22 and the collapsible sidewall 24, and comes into contact with the interior surface of the collapsible sidewall 24. The limiter 26 ensures that the fluid passes between the upper surface of the bottom panel 22 and the interior surface of the collapsible sidewall 24. As discussed above, the limiter 26 may be provided in discrete segments along its length to facilitate the flow of the fluid F into the void space V between the bottom panel 22 and the collapsible sidewall 24. As shown in FIG. 5, hydrostatic pressure of the fluid F begins to force the collapsible sidewall 24 upward. Thus, the collapsible sidewall 24 does not require the use of a flotation device to raise the sidewall 24 when fluid is introduced into the berm. Instead, the collapsible sidewall 24 is raised by the hydrostatic pressure of the fluid itself.

Figure 6:
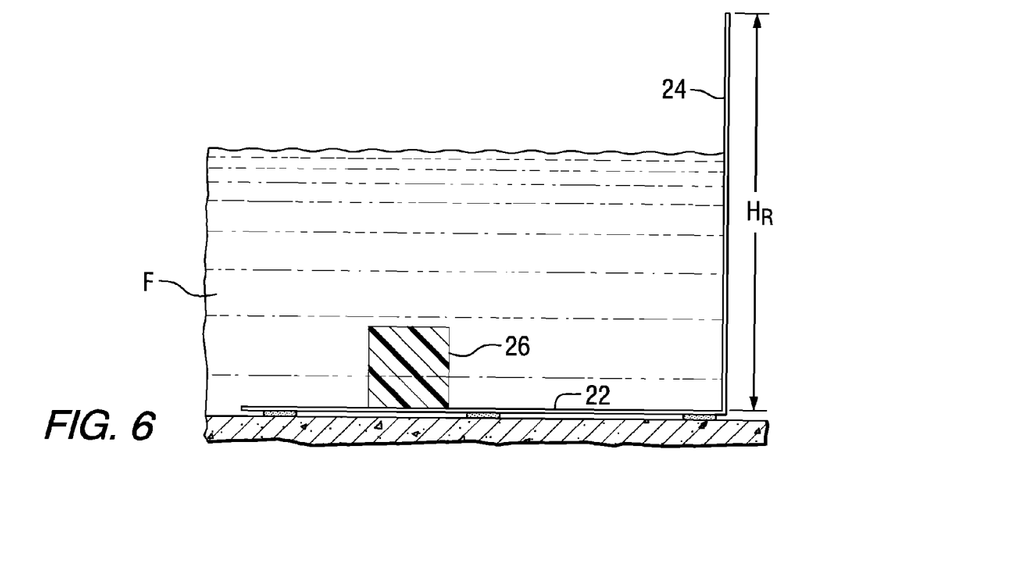
FIG. 6 is a partially schematic side view similar to FIG. 3 with the sidewall in a fully raised position as a result of hydrostatic pressure applied by a fluid contained in the berm.

As shown in FIG. 6, the collapsible sidewall 24 has moved to its raised position as the fluid F continues to fill the containment berm 10. In the raised position shown in FIG. 6, the collapsible sidewall 24 has a raised position height $H_R$ sufficient to contain the fluid F. The raised position height $H_R$ is measured from the bottom panel 22 to the upper edge of the collapsible sidewall 24.

In accordance with embodiments of the present invention, the partially collapsed position height $H_P$, fully collapsed position height $H_F$, and raised position height $H_R$ may be selected in order to provide both sufficient fluid containment capabilities and drive-over capabilities for the self-raising drive-over entranceway 20. For example, the partially collapsed position height $H_P$ may be at least 10 percent or 20 percent greater than the fully collapsed height $H_F$. In certain embodiments, the partially collapsed position height $H_P$ may be from 50 percent to 500 percent greater than the fully collapsed position height $H_F$.

The raised position height $H_R$ of the collapsible sidewall 24 may be selected in order to provide desired fluid containment. In certain embodiments, the raised position height $H_R$ may range from 1.5 to 18 inches, for example, from 2 to 12 inches. The raised position height $H_R$ may be at least twice as high as the partially collapsed position height $H_P$, for example the ratio of $H_R:H_P$ may range from 5:1 to 40:1, or from 8:1 to 30:1, or from 10:1 to 20:1.

Although the containment berm 10 shown in the figures has bottom panels that do not extend across the entire width or length of the containment berm 10, it is to be understood that a continuous bottom panel or sheet may alternatively be provided. For example, the bottom panel 22 may extend across the entire interior length and width of the sidewalls 12 in order to provide a continuous fluid-containing floor across the bottom of the containment berm 10. In this case the containment berm may be portable, and adhesives or other sealants may not be required or desired for securing and sealing the bottom surfaces of the bottom panel 22 and sidewalls 12 to the ground.

Figure 7:
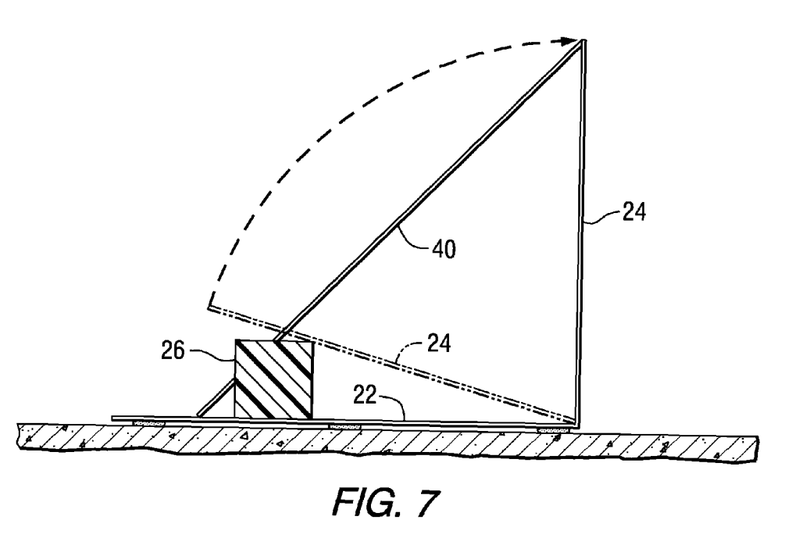
FIG. 7 is a partially schematic side view illustrating movement of a collapsible sidewall from a partially collapsed position to a raised position in which the sidewall is restrained by a strap in accordance with an embodiment of the present invention.

FIG. 7 is a partially schematic side view showing movement of the collapsible sidewall 24 from the partially collapsed position (shown in FIG. 3 in phantom) to its raised position similar to the position (shown in FIG. 6). However, FIG. 7 also illustrates the extended position of a restraining strap 40 that prevents the collapsible sidewall 24 from rotating past its substantially vertical position. Any suitable number of restraining straps 40 may be used, e.g., 1, 2, 3, 4, 5 or more. Each restraining strap 40 may comprise a sheet of foldable material, hinged rigid members, and the like. As more fully described below, in one embodiment, the restraining strap(s) may also act as a limiter to maintain a sufficient void space between the bottom panel 22 and the collapsible sidewall 24.

Figure 8:
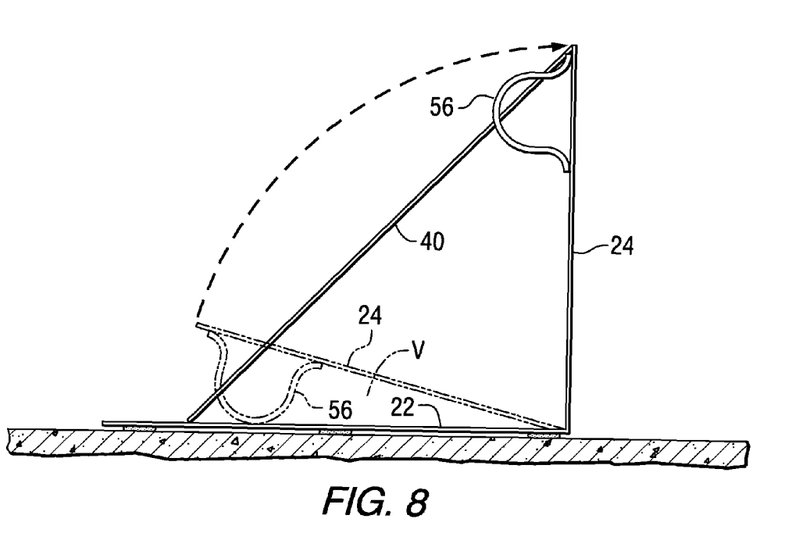
FIG. 8 is a partially schematic side view illustrating movement of a collapsible sidewall and an attached limiter from a partially collapsed position to a raised position where the sidewall is restrained by a strap.

FIG. 8 illustrates another embodiment of the present invention in which a limiter 56 is secured to the collapsible sidewall 24 instead of the bottom panel 22. In the embodiment shown, the limiter 56 is provided in the form of an open pocket or loop of material formed from a strip of flexible material having its edges attached to the collapsible sidewall 24. The space inside the limiter 56 may be open to the atmosphere, e.g., the inner space may be in the form of an air gap that is not sealed and/or pressurized. As shown in FIG. 8, when the collapsible sidewall 24 moves from its partially collapsed position (shown in phantom) to its raised position, the limiter 56 is secured to, and travels with, the collapsible sidewall 24. Any suitable means for attaching the limiter 56 to the collapsible sidewall 24 and/or to the bottom panel 22 may be used in accordance with the present invention, for example, adhesives, welding, stitching, mechanical fasteners, clamps and the like.

In the embodiment shown in FIG. 8, the limiter 56 is attached to the interior surface of the collapsible sidewall 24 at a location that is spaced from the upper edge of the sidewall 24. For example, the limiter 56 may be separated from the upper edge of the collapsible sidewall 24 a distance that is at least 5 or 10 percent of the raised height of the sidewall 24. As shown in phantom in FIG. 8, such a spacing distance creates an overhang of the edge of the collapsible sidewall 24 over the limiter 56. The overhang helps ensure that any fluid that fills the containment berm will pass under the overhang of the collapsible sidewall 24 and into the void space V between the bottom panel 22 and sidewall 24 to thereby exert hydrostatic pressure against the interior surface of the sidewall 24 to force it to raise. The embodiment shown in FIG. 8 does not require the use of a flotation device to raise the sidewall 24 upon introduction of a fluid into the berm, but rather relies on the hydrostatic pressure of the fluid.

Figure 9:
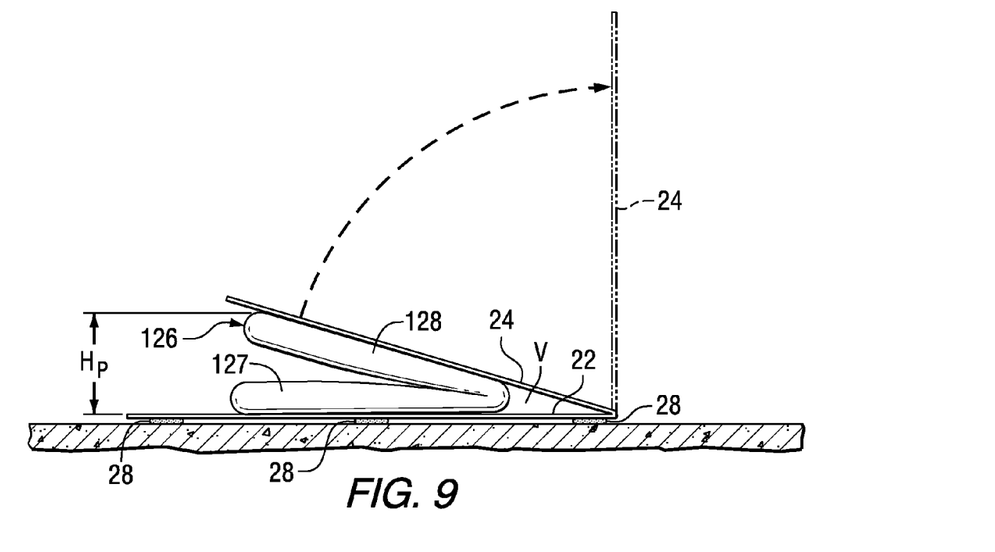
FIGS. 9 and 10 are partially schematic side views illustrating movement of a collapsible sidewall from a partially collapsed position (FIG. 9) in which the sidewall rests on a limiter to a raised position (FIG. 10) in which the sidewall is restrained by the limiter.
Figure 10:
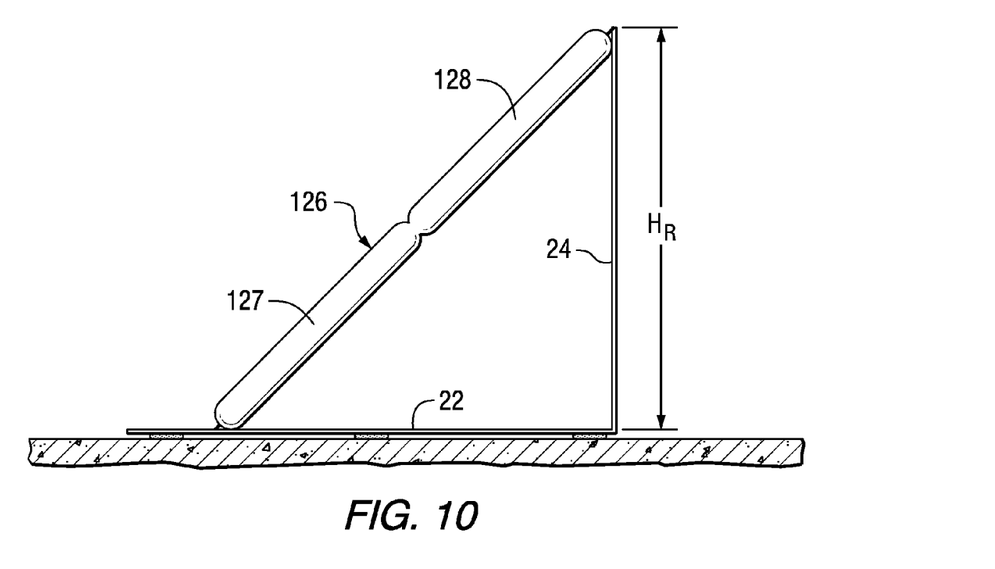

FIGS. 9 and 10 illustrate the use of a limiter 126 in accordance with another embodiment of the present invention. As shown in FIG. 9, when the collapsible sidewall 24 is initially in its partially collapsed position, the limiter 126 maintains the void space V and the collapsible sidewall 24 is held at its the partially collapsed position height $H_P$ described above. In the embodiment shown, the limiter 126 has a bottom leg 127 attached to the bottom panel 22 and top leg 128 attached to the collapsible sidewall 24 that may be folded together as shown in FIG. 9. Although the bottom and top legs 127 and 128 form a V-shape in the embodiment shown in FIG. 9, it is to be understood that the bottom and top legs may alternatively lie flat against each other. As shown in FIG. 10, when the collapsible sidewall 24 moves from its partially collapsed position $H_P$ to its raised position $H_R$, the limiter 126 also serves as a restraining strap that prevents over rotation of the collapsible sidewall 24 past its substantially vertical position. Each or both legs 127 and 128 may have a thickness of from 0.02 to 1 inch, or from 0.1 to 0.8 inch, or from 0.15 to 0.5 inch, to achieve the desired partially collapsed height $H_P$ of the collapsible sidewall 24. Alternatively, pockets or gaps may be provided between the folded bottom and top legs 127 and 128, between the bottom leg 127 and bottom panel 22 and/or between the top leg 128 and the collapsible sidewall 24 in order to achieve the desired partially collapsed height $H_P$ of the sidewall 24.

Whereas particular embodiments of this invention have been described above for purposes of illustration, it will be evident to those skilled in the art that numerous variations of the details of the present invention may be made without departing from the invention as defined in the appended claims.

What is claimed is:

1. A containment berm comprising:
   at least two fluid-containing sidewalls located at opposing sides of the containment berm, wherein the containment berm does not include a continuous floor extending between the opposing fluid-containing sidewalls; and
   at least one entranceway attached to the at least two fluid-containing sidewalls, the at least one entranceway comprising:
      a bottom panel;
      a collapsible sidewall movable from a partially collapsed position to a raised position upon introduction of a fluid into the containment berm, and movable from the partially collapsed position to a fully collapsed position upon traverse of a vehicle across the entranceway; and
      a compressible limiter comprising a resilient material attached to the bottom panel structured and arranged to support the collapsible sidewall in its partially collapsed position, wherein the compressible limiter is resiliently compressible from a non-compressed height when the collapsible sidewall is in the partially collapsed position to a compressed height when the collapsible sidewall is in the fully collapsed position.

2. The containment berm of claim 1, wherein the compressible limiter is also attached to the collapsible sidewall.

3. The containment berm of claim 1, wherein the non-compressed height of the compressible limiter is from 0.1 to 2 inches measured from the bottom panel.

4. The containment berm of claim 1, wherein the collapsible sidewall has a raised height $H_R$ in its raised position that is at least 5 times greater than a partially collapsed height $H_P$ of the collapsible sidewall in its partially collapsed position.

5. The containment berm of claim 4, wherein the ratio of $H_R:H_P$ is from 8:1 to 20:1.

6. The containment berm of claim 1, wherein the collapsible sidewall has a partially collapsed height $H_P$ in its partially collapsed position that is at least 20 percent greater than a fully collapsed height $H_F$ of the collapsible sidewall in its fully collapsed position.

7. The containment berm of claim 1, wherein the compressible limiter comprises a compressible foam material.

8. The containment berm of claim 1, wherein the compressible limiter comprises an open loop or pocket of flexible sheet material.

9. The containment berm of claim 1, wherein the compressible limiter is structured and arranged to prevent the collapsible sidewall from moving past its raised position.

10. The containment berm of claim 1, further comprising at least one restraining strap structured and arranged to prevent the collapsible sidewall from moving past its raised position.

11. The containment berm of claim 1, further comprising a foldable flap attached between the at least one fluid-containing sidewall and the collapsible sidewall.

12. The containment berm of claim 1, wherein the at least one fluid-containing sidewall comprises a bottom surface with an adhesive applied thereto for securing the at least one fluid-containing sidewall to a floor or ground.

13. The containment berm of claim 1, wherein the at least two fluid-containing sidewalls are non-collapsible and substantially rigid.

14. The containment berm of claim 1, wherein the collapsible sidewall does not include a flotation device attached thereto and is movable from the partially collapsed position toward the raised position as a result of hydrostatic force applied by the fluid against the collapsible sidewall.

15. A containment berm comprising:
   at least two fluid-containing sidewalls located at opposing sides of the containment berm, wherein the containment berm does not include a continuous floor extending between the opposing fluid-containing sidewalls; and
   at least one entranceway attached to the at least two fluid-containing sidewalls, the at least one entranceway comprising:
      a bottom panel;
      a collapsible sidewall movable from a partially collapsed position to a raised position upon introduction of a fluid into the containment berm, and movable from the partially collapsed position to a fully collapsed position upon traverse of a vehicle across the entranceway, wherein the collapsible sidewall does not include a flotation device attached thereto and is movable from the partially collapsed position toward the raised position as a result of hydrostatic force applied by the fluid against the collapsible sidewall; and
      a limiter between the bottom panel and the collapsible sidewall structured and arranged to support the collapsible sidewall in its partially collapsed position.

16. A containment berm comprising:
   at least one substantially rigid modular non-collapsible fluid-containing sidewall; and
   at least one collapsible entranceway attached to the at least one non-collapsible fluid-containing sidewall, the at least one collapsible entranceway comprising:
      a bottom panel;
      a collapsible sidewall movable from a partially collapsed position to a raised position upon introduction of a fluid into the containment berm, and movable from the partially collapsed position to a fully collapsed position upon traverse of a vehicle across the entranceway; and
      a compressible limiter between the bottom panel and the collapsible sidewall structured and arranged to support the collapsible sidewall in its partially collapsed position.

* * * * *